United States Patent
Miyasaka

(10) Patent No.: US 9,582,231 B2
(45) Date of Patent: Feb. 28, 2017

(54) PRINTER CONTROL DEVICE, PRINTING SYSTEM, AND CONTROL METHOD THAT DELETES UNNECESSARY DATA DUE TO INTERRUPTION

(71) Applicant: Seiko Epson Corporation, Tokyo (JP)

(72) Inventor: Masayo Miyasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/641,693

(22) Filed: Mar. 9, 2015

(65) Prior Publication Data

US 2015/0277832 A1    Oct. 1, 2015

(30) Foreign Application Priority Data

Mar. 26, 2014  (JP) .................................. 2014-063241
May 30, 2014   (JP) .................................. 2014-112610

(51) Int. Cl.
*H04N 1/00*    (2006.01)
*G06F 3/12*    (2006.01)
*G06K 15/02*   (2006.01)

(52) U.S. Cl.
CPC ............ *G06F 3/1274* (2013.01); *G06F 3/122* (2013.01); *G06F 3/1204* (2013.01); *G06F 3/1219* (2013.01); *G06F 3/1234* (2013.01); *G06K 15/024* (2013.01); *G06K 15/1807* (2013.01); *G06K 15/1805* (2013.01)

(58) Field of Classification Search
None
See application file for complete search history.

(56) References Cited

U.S. PATENT DOCUMENTS

| 5,469,533 A * | 11/1995 | Dennis ................. G06F 3/1296 358/1.11 |
| 7,158,243 B2 * | 1/2007 | Sakamoto ............. G06F 3/126 358/1.1 |
| 7,551,313 B2 * | 6/2009 | Kuroki .................. G06F 3/1205 358/1.16 |
| 2001/0022912 A1 | 9/2001 | Miyasaka et al. |
| 2002/0001104 A1 * | 1/2002 | Shima .................... G06K 15/00 358/442 |
| 2004/0218204 A1 | 11/2004 | Nomura |
| 2006/0232619 A1 * | 10/2006 | Otsuka ................... G06K 15/00 347/5 |
| 2011/0164886 A1 * | 7/2011 | Sawada ................. G03G 15/55 399/8 |

FOREIGN PATENT DOCUMENTS

| JP | 2001-331300 | 11/2001 |
| JP | 2004-130784 | 4/2004 |
| JP | 2008-310419 | 12/2008 |

* cited by examiner

*Primary Examiner* — Gabriel Garcia

(57) ABSTRACT

A control device of a printer can delete unnecessary data left in the printer when processing is interrupted without relying on user intervention. A control device of a printer that prints according to print data has a transmission monitor unit that sends the print data to the printer. Based on the status of a storage unit of the printer, the transmission monitor unit sends a command to delete identical data from the storage unit to the printer before sending the print data to the printer.

17 Claims, 2 Drawing Sheets

PRINTER CONTROL DEVICE, PRINTING SYSTEM, AND CONTROL METHOD THAT DELETES UNNECESSARY DATA DUE TO INTERRUPTION

The instant application claims the benefit of Japanese patent application No. 2014-063241 filed Mar. 26, 2014 and No. 2014-112610 filed May 30, 2014, which are hereby incorporated by reference in their entirety.

BACKGROUND

1. Technical Field

The present disclosure relates to a control device of a printer, and relates more particularly to a printer control device, a printing system, and a control method that can clear unnecessary data left in the printer due to interruption of a process, for example, without depending on an operation by the user.

2. Related Art

Printers normally execute printing processes based on print data sent from a host device, and the process may be interrupted for some reason occurring during the printing process. For example, the printing process is interrupted when a problem such as a paper jam occurs in the printer, or when a printer cover is opened.

When the printing process is thus interrupted, print data that has not been processed yet remains stored in the printer, and the printing process is typically repeated from the beginning of the print job after operation resumes. As a result, the print data that is left in memory is unnecessary data, referred to herein as trash data, and if this trash data is not deleted, it will be unnecessarily printed again after operation resumes, resulting in wasted printing.

Various efforts have been made to solve this problem of wasted printing. The printer described in JP-A-2004-130784, for example, executes a process of stopping printing, discarding the received print data to a code indicating a specific break point, and sending a cancel data request to the host, for example, in response to a cancel printing operation performed by pressing a button on the operating panel.

One example of unnecessary data being left in the printer occurs when the printer cannot quickly detect that a print job was cancelled and print data for the print job remains in the print spooler on the host device. This situation is preferably handled by a function on the host side.

The effect of this problem is particularly great when relatively large amounts of image data are used, such as when printing labels, and the image data remains as unnecessary data in memory, and a more reliable solution is required.

Preferably, such unnecessary data can be deleted without requiring the user to perform a specific operation.

SUMMARY

A print control device according to at least one embodiment of the present invention can delete unnecessary data left in printer memory due to interruption of the printing process, for example, without relying on user intervention.

A control device of a printer that prints according to print data has a transmission monitor unit that sends the print data to the printer. The transmission monitor unit determines whether or not to apply a data deletion process to the storage unit before sending the print data to the printer according to the status of a storage unit of the printer.

Preferably, when data identical to data contained in the print data is in a storage unit of the printer, the transmission monitor unit sends a command to delete the identical data from the storage unit to the printer before sending the print data.

Further preferably, the transmission monitor unit acquires identification information for the data in the storage unit of the printer, and based on the identification information determines if identical data is already in the storage unit.

Further preferably, the storage unit of the printer includes a first storage unit and a second storage unit; the data includes image data; and the transmission monitor unit sends the data to the printer so that the image data is stored in the first storage unit and other data is stored in the second storage unit.

Further preferably, the transmission monitor unit sends the print data to the printer after checking the storage space available in the storage unit.

In another aspect of at least one embodiment of the present invention, the print data is data for printing multiple labels.

In another aspect of at least one embodiment of the present invention, the transmission monitor unit sends a command to the printer to acquire information about the status of the storage unit, and if the information indicates the image data remains in the storage unit, determines to apply the data deletion process to the storage unit, and sends a command instructing executing the data deletion process to the printer.

Another aspect of at least one embodiment of the present invention is a printing system including: a printer that prints according to print data; and a control device of the printer. The control device includes a transmission monitor unit that sends the print data to the printer. The printer includes a storage unit that stores data contained in the print data. The transmission monitor unit, based on the status of the storage unit of the printer, determines whether or not to apply a data deletion process to the storage unit before sending the print data to the printer.

Another aspect of at least one embodiment of the present invention is a control method of a host device of a printer that prints according to print data, the control method including: sending the print data to the printer; and determining whether or not to apply a data deletion process to the storage unit of the printer before sending the print data to the printer based on the status of the printer storage unit.

Other objects and attainments together with a fuller understanding of the invention will become apparent and appreciated by referring to the following description and claims taken in conjunction with the accompanying drawings.

DESCRIPTION OF EMBODIMENTS

Figure 1:
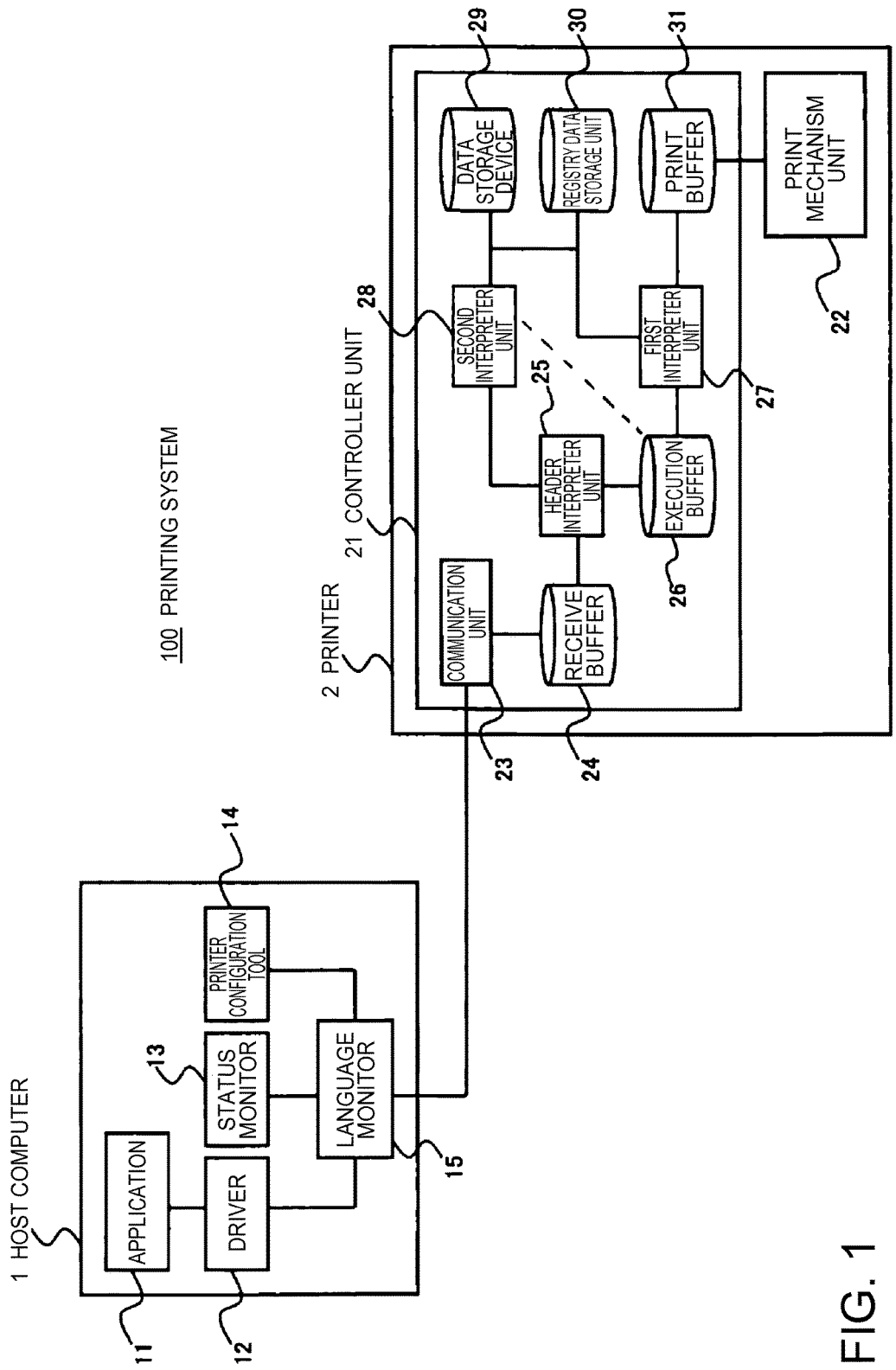
FIG. 1 is a block diagram illustrating the configuration of a printing system according to some embodiments of the present invention.

Some embodiments of the present invention are described below with reference to the accompanying figures. However, the technical scope of the invention is not limited to the embodiments described below. Note also that identical or similar elements described below are identified by the same reference numerals or reference symbols.

FIG. 1 is a block diagram of a printing system according to some embodiments of the present invention. The printing system 100 shown in FIG. 1 is a printing system according to some embodiments of the present invention, and includes a host computer 1 and a printer 2. If the image data to be sent is already stored in the data storage device 29 that temporarily stores image data when print data is sent to the printer 2, the language monitor 15 of the host computer 1 sends a command to delete the image data to the printer 2 and then executes the process of sending the print data to the printer 2. As a result, unnecessary data resulting from interruption of the printing process, that is trash data, can be reliably deleted.

The printing system 100 according to this embodiment is an example of a system that prints continuously to multiple labels delivered on roll paper, for example.

The host computer 1 (printer control device) is a printer 2 host device that sends print data to the printer 2 and outputs print requests (commands), and in this embodiment is embodied by a personal computer. Therefore, while not shown in the figures, the host computer 1 includes a CPU, RAM, hard disk drive, communication interface, and operating devices. The host computer 1 communicates bidirectionally with the printer 2 through a standard USB connection.

Functionally, the host computer 1 includes an application 11, a driver 12, a status monitor 13, a printer configuration tool 14, and a language monitor 15 as shown in FIG. 1.

The application 11 is the source of the printing process request, and in one example creates the content to be printed on the printout (such as a label). The application 11 sends print request data expressing the content to print to the driver 12 in response to a user operation on the host computer 1, for example.

The driver 12 is a driver for the printer 2, and when print request data from the application 11 generating the print request is received, creates print data expressing the print content with print commands for the printer 2, and then sends the print data to the printer 2.

The status monitor 13 continuously reports the status (condition) of the printer 2 to the user of the printing system 100. For example, the status monitor 13 sends a status request to the printer 2 at a specific time interval to acquire status information for the printer 2, and executes a process to display the status information in a specific way on the display unit (not shown in the figure) of the host computer 1. The status monitor 13 executes the same status display process when the user performs a specific operation.

The printer configuration tool 14 is used by the user to configure the printing parameters (printing conditions) for the printer 2, and to register the fonts, layouts, and background images (image data) used in common for the printouts. The printer configuration tool 14 sends configuration and registration request commands to the printer 2 in response to a user operation.

The language monitor 15 (transmission monitor unit) monitors communication with the printer 2, and controls data transmissions to the printer 2. Therefore, data sent from the above driver 12, status monitor 13, and printer configuration tool 14 to the printer 2 is first received and buffered by the language monitor 15. Next, the language monitor 15 sends the received data according to a specific timing in a specific order to the printer 2. The language monitor 15 of the printing system 100 according to this embodiment is characterized by the process for sending print data to the printer 2. The specific content of this process is described further below. The language monitor 15 also receives replies (responses) to requests from the host computer 1 from the printer 2, and passes the received content to the originator of the request (the status monitor 13 or printer configuration tool 14, for example).

Note that the application 11, driver 12, status monitor 13, printer configuration tool 14, and language monitor 15 are rendered by a program describing the steps in the processes, a CPU that executes the processes according to the program, RAM, and other components.

The data the language monitor 15 sends to the printer 2 includes print data received from the driver 12, status request commands received from the status monitor 13, and configuration and registration commands received from the printer configuration tool 14.

Commands sent to the printer 2 include the four types of commands described below.

A Save File command is a command for pre-storing image data files that are used in printing processes in the printer 2. In addition to images, Save File commands include commands for storing (registering) font and character codes files, for example. These commands are sent from the driver 12 and printer configuration tool 14.

A Print Instruction command is a command specifying objects in the images (printout) to be printed. Print Instruction commands include commands that specify text, graphic, and image objects. These commands are sent from the driver 12.

A Configuration command is a command for setting parameters for printing (printing conditions) by the printer 2, and Configuration commands include commands for setting the resolution and print media. These commands are sent from the driver 12 and printer configuration tool 14.

Control commands are commands, such as status request commands described above, enabling the host computer 1 to monitor and control the printer 2. Control commands include commands for acquiring the printer status, acquiring version information, and acquiring buffer capacity information. These commands are sent from the status monitor 13.

Due to differences in the process units of the printer 2, Print Instruction command and Configuration commands are referred to as first data, and Save File commands and Control commands are referred to as second data.

As described above, the printing system 100 according to this embodiment anticipates printing using image data, and the printed images include common images such as background images that are common to different printouts (such as labels), and individual images that differ according to the specific content of the printout. The labels have adhesive on the back, are supplied affixed to a continuous web (liner), and are produced by printing to label paper having multiple labels affixed at a regular interval to the liner.

Product labels, for example, may be printed with a common background image on each label and a barcode that differs according to the particular product. In this example, the image data for the common image (background image) and the image data for the individual image (barcode) are respectively referred to as the common image data and the individual image data.

Note that the common image data and the individual image data are stored by the Save File command described above with a name specified by the host computer 1 to the address specified by the host computer 1 before the image data is used for printing. The Save File command for the individual image data is sent to the printer 2 as print data for the printouts. A command for deleting the individual image data is also included at the end of the print data of each printout. As a result, the individual image data used for each printout is deleted on the printer 2 by the print data for the printout.

The printer 2 is an inkjet line printer for printing labels, for example. As shown in FIG. 1, the printer 2 has a controller unit 21 and a print mechanism unit 22. The controller unit 21 controls various parts of the printer 2, and based on data received from the host computer 1, generates print execution data for controlling printing by the print mechanism unit 22.

The controller unit 21 includes CPU, RAM, ROM, NVRAM, ASIC, and an SD card, not shown, in a functional arrangement such as shown in FIG. 1.

The communication unit 23 controls communication with the host computer 1. The communication unit 23 receives data sent from the language monitor 15, and sends response data to the host computer 1.

The receive buffer 24 is a storage unit that temporarily stores data received by the communication unit 23 from the host computer 1 until processing, and in this example is RAM. The data stored to the receive buffer 24 is deleted (discarded) after being read by the header interpreter unit 25.

The header interpreter unit 25 (command identification unit) sequentially reads data stored in the receive buffer 24, and interprets the header portion. More specifically, the header interpreter unit 25 identifies the content (type) of data from the header, for example, of the read data. More specifically, it determines which of the four types of command the data is, saves the data to the execution buffer 26 (second storage unit) if the data is first data, and passes the data to the second interpreter unit 28 if the data is second data.

The execution buffer 26 is a storage unit (second storage unit) that temporarily stores the first data until the first data is processed, and in this embodiment is RAM. The data stored in the execution buffer 26 is sequentially read by the first interpreter unit 27, and is deleted (discarded) after being read.

The first interpreter unit 27 is the part that sequentially reads and processes the first data stored to the execution buffer 26. If the read data is a Print Instruction command, the first interpreter unit 27 interprets the command and generates print execution data, and stores the print execution data to the print buffer 31. When generating the print execution data, the first interpreter unit 27 accesses and uses the individual image data stored in the data storage device 29, and the font data, layout data, and common image data stored in the registry data storage unit 30, as needed.

If the read data is a Configuration command, the first interpreter unit 27 interprets the command and executes a process appropriate to the result. If the command is a registration command for font data, layout data, or common image data, the first interpreter unit 27 stores the data to specific addresses in the registry data storage unit 30. If the command is a Configuration command for printing conditions, the first interpreter unit 27 executes a configuration process according to the command.

The second interpreter unit 28 processes the second data sent from the header interpreter unit 25. When the second data is individual image data, the second interpreter unit 28 stores the data in the data storage device 29. When the second data is registration data for common image data, for example, the second interpreter unit 28 stores the data in the registry data storage unit 30. When the second data is a status request command, the second interpreter unit 28 gets the status information and responds to the host computer 1 through the communication unit 23.

The data storage device 29 is a storage unit (first storage unit) that temporarily stores individual image data (files), and is RAM in this embodiment. As described above, a command to delete (discard) the individual image data in the print data is included at the end of the print data (print command) of the printout (such as a for labels). When this command is interpreted by the first interpreter unit 27, the individual image data is deleted from the data storage device 29. Note that a name (identification information) determined by the host computer 1 is added to the stored individual image data, and this name is specified for the first interpreter unit 27 to use or to delete the individual image data.

The registry data storage unit 30 stores data that is printed the same on different printouts (such as labels). The registry data storage unit 30 is a nonvolatile storage medium such as NVRAM or an SD card that is not erased when the printer 2 power turns off. More specifically, the registry data storage unit 30 stores the common image data, font data, and layout data.

The print buffer 31 temporarily stores the print execution data generated by the first interpreter unit 27. The print buffer 31 is RAM in this embodiment. Transmission of the print execution data from the print buffer 31 is synchronized to the operation of the print mechanism unit 22 during the printing process when printing to the print medium.

The print mechanism unit 22 prints on the print medium (such as paper) and outputs the printout (such as labels) as controlled by the controller unit 21. In the case of an inkjet printer, the print mechanism unit 22 includes a printhead with multiple nozzles that eject ink, and a conveyance unit that conveys the print medium. The paper is stored in a roll, and is conveyed by the conveyance unit to the printing position.

When the printer 2 thus comprised receives data from the host computer 1, the data is received through the communication unit 23 and stored in the receive buffer 24. The data stored in the receive buffer 24 is then sequentially read by the header interpreter unit 25, and the header interpreter unit 25 determines what kind of data was received.

If the header interpreter unit 25 determines the received data is the first data, the header interpreter unit 25 passes the data to the execution buffer 26. If the data is the second data, the header interpreter unit 25 passes the data to the second interpreter unit 28. Note that the header interpreter unit 25 continues processing the data even when an error occurs and the printing process stops temporarily (is interrupted).

Data transferred and stored from the execution buffer 26 is sequentially processed by the first interpreter unit 27. The first interpreter unit 27 generates print execution data based on the print data, and sends the print execution data to the print buffer 31. The first interpreter unit 27 also executes a process for setting the printing conditions based on Configuration commands contained in the print data, and executes a process to delete individual image data in the data storage device 29 based on any Delete commands described above.

If the data passed to the second interpreter unit 28 is a Control command such as a status request command, the second interpreter unit 28 immediately executes a process appropriate to the command. In the event if a status request command, the second interpreter unit 28 acquires and returns the status information of the printer 2 to the language monitor 15 of the host computer 1. If the data is a Save File command for individual image data, the second interpreter unit 28 passes and stores the data in the data storage device 29. Note that the second interpreter unit 28 continues processing the data even when an error occurs and the printing process stops temporarily (is interrupted). Temporarily stopping the printing process includes stopping processing by the first interpreter unit 27 and the print mechanism unit 22.

When the printing process is temporarily stopped in the printer 2, the header interpreter unit 25 continues processing unless the execution buffer 26 is full and first data is not read from the receive buffer 24.

The second interpreter unit 28 also continues processing unless image data exceeding the available capacity in the data storage device 29 is received.

Because processing thus continues, data remaining in the receive buffer 24 when the printing process is interrupted can be transferred from the receive buffer 24 to the execution buffer 26 or the data storage device 29 if there is sufficient space in the execution buffer 26 and data storage device 29, and storage space can be kept available in the receive buffer 24.

If all print data was not received, such as when a print job (print data) in the print spooler (not shown in the figure) of the host computer 1 is cancelled, the delete command for the individual image data at the end of the print data will not reach the printer 2. Therefore, even if the received print commands are processed, the individual image data stored in the data storage device 29 will not be deleted and will remain in memory. The same situation occurs when all print commands are received but the printing process is interrupted and the print commands are deleted by a function of the printer 2.

When the printing process is interrupted by cancelling a print job in the print spooler, the application 11 on the host computer 1 knows the job was cancelled and requests retransmission of the print data for the print job that was cancelled. This request results in individual image data identical to the individual image data that was not deleted and remains in the data storage device 29 being sent to the printer 2 again.

Figure 2:
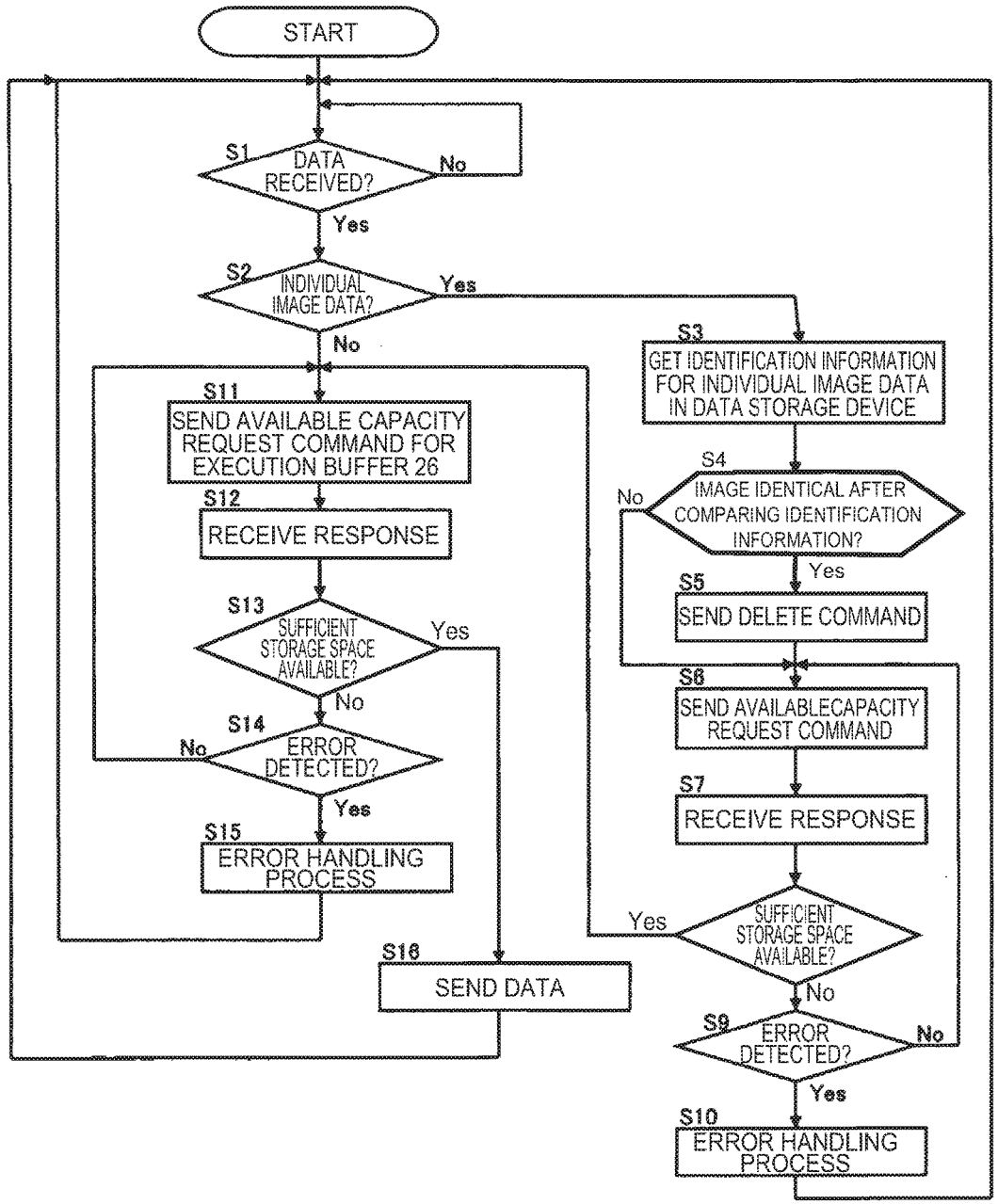
FIG. 2 is a flow chart in steps of a process executed by a language monitor 15.

As described above, the printing system 100 according to this embodiment is characterized by the process the language monitor 15 executes when sending print data, and this process is described in further detail below. FIG. 2 is a flow chart showing an example of the process executed by the language monitor 15.

After starting, the language monitor 15 waits for a data transmission request from the driver 12, status monitor 13, or printer configuration tool 14 (step S1 in FIG. 2 returns NO). If a data transmission request is received (step S1 in FIG. 2 returns YES), the language monitor 15 determines if the data requested to be sent is a Save File command for individual image data (step S2 in FIG. 2).

If the result of this decision is that the data requested to be sent is not a Save File command for individual image data (step S2 in FIG. 2 returns NO), control goes to step S11.

If the result of this decision is that the data requested to be sent is a Save File command for individual image data (step S2 in FIG. 2 returns YES), the language monitor 15 sends a Control command requesting the identification information of the individual image data stored in the data storage device 29 to the printer 2.

When the request command is received by the printer 2, the command is processed by the second interpreter unit 28 because it is second data as described above. The second interpreter unit 28 then acquires the identification information (name) for the individual image data stored in the data storage device 29, and returns the information to the host computer 1. The language monitor 15 thus receives the returned information and acquires the identification information (step S3 in FIG. 2).

The language monitor 15 then compares the identification information (name) of the individual image data requested to be sent with the identification information acquired from the printer 2, that is, with the identification information for the individual image data stored (left) in the data storage device 29 (step S4 in FIG. 2). If this comparison determines the identification information is the same, that is, the individual image data is the same (step S4 in FIG. 2 returns YES), the language monitor 15 generates and sends a delete command for the individual image data stored (left) in the data storage device 29 to the printer 2 (step S5 in FIG. 2).

If individual image data for plural images is stored in the data storage device 29, the language monitor 15 acquires the identification information for all of the images, and if the identification information of any stored individual image data matches the identification information (name) of the individual image data the language monitor 15 is requested to send, the language monitor 15 sends a delete command for the individual image data of the matching identification information.

The individual image data is normally different for each printout (label). If individual image data of the same (name) as the individual image data to be sent remains in the data storage device 29, the printing process using that individual image data may have been interrupted and the application 11 requested sending the same print data again. As a result, the individual image data remaining in the data storage device 29 is unnecessary and a delete command is therefore sent.

The delete command sent to the printer 2 is processed by the host computer 1 as first data and is processed by the first interpreter unit 27, that is, the data left in the data storage device 29 is deleted by the first interpreter unit 27.

After sending the delete command (S5), or if step S4 does not detect the same image in the data storage device 29 (step S4 returns NO), control goes to step S6.

In step S6, the language monitor 15 sends a request to check the available capacity in the data storage device 29 to the printer 2 (step S6 in FIG. 2). This available capacity request command is a command that queries the printer 2 for how much space is available in the data storage device 29 to store data.

The available capacity request command is processed as a Control command by the second interpreter unit 28 in the printer 2, and the second interpreter unit 28 returns a response to the command. More specifically, the printer 2 returns information identifying the capacity available in the data storage device 29 to the language monitor 15.

The language monitor 15 receives the response (step S7 in FIG. 2), and then determines if there is sufficient space in the data storage device 29 to store the received individual image data (step S8 in FIG. 2). More specifically, the language monitor 15 knows the amount of storage space available in the data storage device 29 from the information in the response, determines there is sufficient capacity if the amount of available storage space is greater than the size of the individual image data, and otherwise determines there is not enough space.

If the decision is that there is sufficient storage space (step S8 in FIG. 2 returns YES), control goes to step S11.

If the decision is that there is not sufficient storage space (step S8 in FIG. 2 returns NO), the language monitor 15 determines to not send the received individual image data at that time, and control returns to step S6 if a specific error condition has not been met (step S9 in FIG. 2 returns NO).

The language monitor 15 then repeats the process from step S6 at a specific time interval until it determines that sufficient storage space is available (step S8 in FIG. 2 returns YES), or until an error is detected (step S9 in FIG. 2 returns YES).

As described above, because the individual image data stored in the data storage device 29 is deleted after it is used, available space in the data storage device 29 will increase as time passes if processing continues normally on the printer 2. An error condition is a condition in which some problem (error) is detected in the printer 2, and the error condition could be a specific time elapsing or the available capacity request command being sent a specific number of times.

If the error condition is met (step S9 in FIG. 2 returns YES), the language monitor 15 executes an error handling process (step S10 in FIG. 2), and then returns to step S1 to wait for the next data. In the error handling process the language monitor 15 discards the received data and reports to the device that sent the data that the data was not sent to the printer 2.

When the process returns to step S2 and it is determined that the received data is not a Save File command for individual image data (step S2 in FIG. 2 returns NO), or if processing goes from step S8 to step S11, the language monitor 15 sends a command requesting the available capacity in the execution buffer 26 to the printer 2 (step S11 in FIG. 2).

This available capacity request command is processed as a Control command by the second interpreter unit 28 in the printer 2, and the second interpreter unit 28 responds to the command. More specifically, the printer 2 returns information identifying the amount of data storage space available in the execution buffer 26 to the language monitor 15.

The language monitor 15 receives the response (step S12 in FIG. 2), and then determines if there is sufficient space in the execution buffer 26 to store the received data (step S13 in FIG. 2).

If the decision is that there is not sufficient storage space (step S13 in FIG. 2 returns NO), the language monitor 15 determines to not send the received individual image data at that time, and control returns to step S11 if a specific error condition has not been met (step S14 in FIG. 2 returns NO). The language monitor 15 then repeats the process from step S11 at a specific time interval until it determines that sufficient storage space is available (step S13 in FIG. 2 returns YES), or until an error is detected (step S14 in FIG. 2 returns YES).

As described above, because the data stored in the execution buffer 26 is deleted after processing, available space in the execution buffer 26 will increase as time passes if processing continues normally on the printer 2. An error condition here is the same as the conditions in step S9.

If the error condition is met (step S14 in FIG. 2 returns YES), the language monitor 15 executes an error handling process (step S15 in FIG. 2), and then returns to step S1 to wait for the next data. In the error handling process the language monitor 15 discards the received data and reports to the device that sent the data that the data was not sent to the printer 2.

When the process returns to step S13 and it is determined there is space sufficient to store the received data is available (step S13 in FIG. 2 returns YES), the language monitor 15 sends the received data t the printer 2 (step S16 in FIG. 2). After sending the data, control returns to step S1 and the language monitor 15 waits to receive the next data.

The data transmission process of the language monitor 15 is thus executed as described above.

As described above, when print data is sent from the host computer 1 in the printing system 100 according to some embodiments of the present invention, the language monitor 15 first checks if individual image data identical to the individual image data to be sent is already stored in the data storage device 29 of the printer 2 that temporarily stores the individual image data, and if the same individual image data is already stored, determines that data is unnecessary data left due to interruption of the printing process, for example, and sends a delete command to the printer 2. As a result, unnecessary image data can be reliably deleted, storage space can be appropriately assured in the storage unit, and unnecessary printing of unnecessary data can be prevented. The process of deleting the unnecessary data can also be executed without user intervention.

Furthermore, because whether or not to execute the process of deleting unnecessary data is decided by the host computer 1, unnecessary data can be deleted even when the printer 2 cannot detect that the print data was interrupted.

As described above, a problem will also not result when the same individual image data is used in a previous normal printing process.

The language monitor 15 checks the storage capacity available in the storage units of the printer 2 before sending print data, and does not send the data if there is not sufficient storage capacity available. Processing being interrupted because the storage units of the printer 2 are full can therefore be prevented. This also enables deleting unnecessary data. The effect of this process is particularly great as a result of applying the process to the data storage device 29 that stores large capacity individual image data.

The disclosure is particularly useful when printing labels and other objects using image data.

Note that the disclosure is particularly suited to printing labels using common images such as background images common to each label, and individual images that are different on each label.

The disclosure being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. A control device configured to control a printer that prints according to print data, the control device comprising:
 a transmission monitor configured to:
 send second print data including second identification information to the printer;
 acquire the second identification information from a storage of the printer;
 compare first identification information, which is included in first print data, with the acquired second identification information, before sending the first print data to the printer;
 send a command to delete the second print data if the first identification information is the same as the second identification information; and
 send the first print data including the first identification information to the printer after sending the command to delete the second print data.

2. The control device described in claim 1, wherein:
the storage of the printer includes a first storage and a second storage;
the second print data includes image data; and
the transmission monitor sends the second print data to the printer so that the second image data is stored in the first storage and other data is stored in the second storage.

3. The control device described in claim 1, wherein:
the transmission monitor sends the first print data to the printer after checking the storage space available in the storage.

4. The control device described in claim 1, wherein:
the first print data is data for printing multiple labels.

5. The control device described in claim 1, wherein:
the transmission monitor sends a command to the printer to acquire information about the status of the storage, and if the information indicates image data of the second print data remains in the storage, determines to apply a data deletion process to the storage, and sends a command instructing executing the data deletion process to the printer.

6. The control device of a printer described in claim 1,
the printer including a registry data storage that stores common image data,
the first print data further including first individual image data that is configured to be printed by the printer with the common image data,
the second print data further including second individual image data that is configured to be printed by the printer with the common image data,
wherein the common image data is not deleted by sending the command to delete the second print data.

7. A printing system comprising:
a printer that prints according to print data; and
a control device configured to control the printer;
wherein the control device includes a transmission monitor configured to:
send second print data including second identification information to the printer;
acquire the second identification information from a storage of the printer;
compare first identification information, which is included in first print data, with the acquired second identification information, before sending the first print data to the printer;
send a command to delete the second print data if the first identification information is the same as the second identification information; and
send the first print data including the first identification information to the printer after sending the command to delete the second print data.

8. The printing system described in claim 7, wherein:
the storage of the printer includes a first storage and a second storage;
the second print data includes image data; and
the transmission monitor sends the second print data to the printer so that the image data is stored in the first storage and other data is stored in the second storage.

9. The printing system described in claim 8, wherein:
the transmission monitor sends a command to the printer to acquire information about the status of the storage, and if the information indicates the image data remains in the first storage, determines to apply a data deletion process to the storage, and sends a command instructing executing the data deletion process to the printer.

10. The printing system described in claim 7, wherein:
the transmission monitor sends the first print data to the printer after checking the storage space available in the storage.

11. The printing system described in claim 7, wherein:
the first print data is data for printing multiple labels.

12. The printing system described in claim 7,
the printer including a registry data storage that stores common image data,
the first print data further including first individual image data that is configured to be printed by the printer with the common image data,
the second print data further including second individual image data that is configured to be printed by the printer with the common image data,
wherein the common image data is not deleted by sending the command to delete the second print data.

13. A control method in a host device of a printer that prints according to print data, the control method comprising:
sending second print data including second identification information to the printer; and
acquiring the second identification information from a storage of the printer;
comparing first identification information, which is included in first print data, with the acquired second identification information, before sending the first print data to the printer;
sending a command to delete the second print data if the first identification information is the same as the second identification information; and
sending the first print data including the first identification information to the printer after sending the command to delete the second print data.

14. The control method described in claim 13, wherein:
the storage of the printer includes a first storage and a second storage;
the second print data includes image data; and
the second print data is sent to the printer so that the image data is stored in the first storage and other data is stored in the second storage.

15. The control method described in claim 14, further comprising:
sending a command to the printer to acquire information about the status of the storage, and if the information indicates the image data remains in the first storage, determines to apply a data deletion process to the storage, and sends a command instructing executing the data deletion process to the printer.

16. The control method described in claim 13, further comprising:
sending the first print data to the printer after checking the storage space available in the storage.

17. The control method described in claim 13,
the printer including a registry data storage that stores common image data,
the first print data further including first individual image data that is configured to be printed by the printer with the common image data,
the second print data further including second individual image data that is configured to be printed by the printer with the common image data,
wherein the common image data is not deleted by sending the command to delete the second print data.

* * * * *